United States Patent [19]
Mendenhall

[11] 4,153,471
[45] May 8, 1979

[54] PROCESS FOR TREATING EXHAUST GASEOUS MIXTURES FROM DIRECTLY EXPOSING ASPHALT-AGGREGATE COMPOSITIONS TO HOT GASES

[76] Inventor: Robert L. Mendenhall, 1770 Industrial Rd., Las Vegas, Nev. 89102

[21] Appl. No.: 754,314

[22] Filed: Dec. 27, 1976

[51] Int. Cl.² .................... C08L 95/00; B01D 53/34
[52] U.S. Cl. ........................... 106/281 R; 423/210; 106/273 R; 422/168
[58] Field of Search ............... 259/147, 146, 148, 155, 259/156, 157, 158, 159 R, 159 A, 3, 2, 14; 106/273 R, 276, 277; 404/79; 201/27; 423/210, 215, 245–247; 431/5; 23/277 C; 366/4, 54

[56] References Cited
U.S. PATENT DOCUMENTS

| | | | |
|---|---|---|---|
| 3,671,402 | 6/1972 | Wenzel | 201/27 |
| 3,804,079 | 4/1974 | Schrader | 423/210 X |
| 3,817,712 | 6/1974 | Wentworth | 423/210 X |
| 3,836,435 | 9/1974 | Skornyakov | 201/27 |
| 3,862,887 | 1/1975 | Bielski | 201/27 |
| 3,866,888 | 2/1975 | Dydzyk | 259/158 |
| 3,888,632 | 6/1975 | Fritz et al. | 23/277 C |
| 3,971,666 | 7/1976 | Mendenhall | 106/273 R |
| 3,977,947 | 8/1976 | Pyle | 201/27 |

*Primary Examiner*—Earl C. Thomas
*Attorney, Agent, or Firm*—Seiler & Quirk

[57] ABSTRACT

The process of the invention comprises directly exposing asphalt-aggregate compositions to hot gases of combustion in which a resulting gaseous mixture comprises mineral particulate matter, nitrogen, carbon dioxide, water vapor, and volatile hydrocarbons resulting from exposure of the asphalt-aggregate composition to the hot gases of combustion, directing the resulting gaseous mixture to a treating chamber and injecting a flame into it. The apparatus according to the invention includes an elongated drum in which asphalt-aggregate composition is exposed directly to flame and/or hot gases of combustion therefrom, and means for exhausting the resulting gaseous mixture to a separate treating chamber.

5 Claims, 1 Drawing Figure

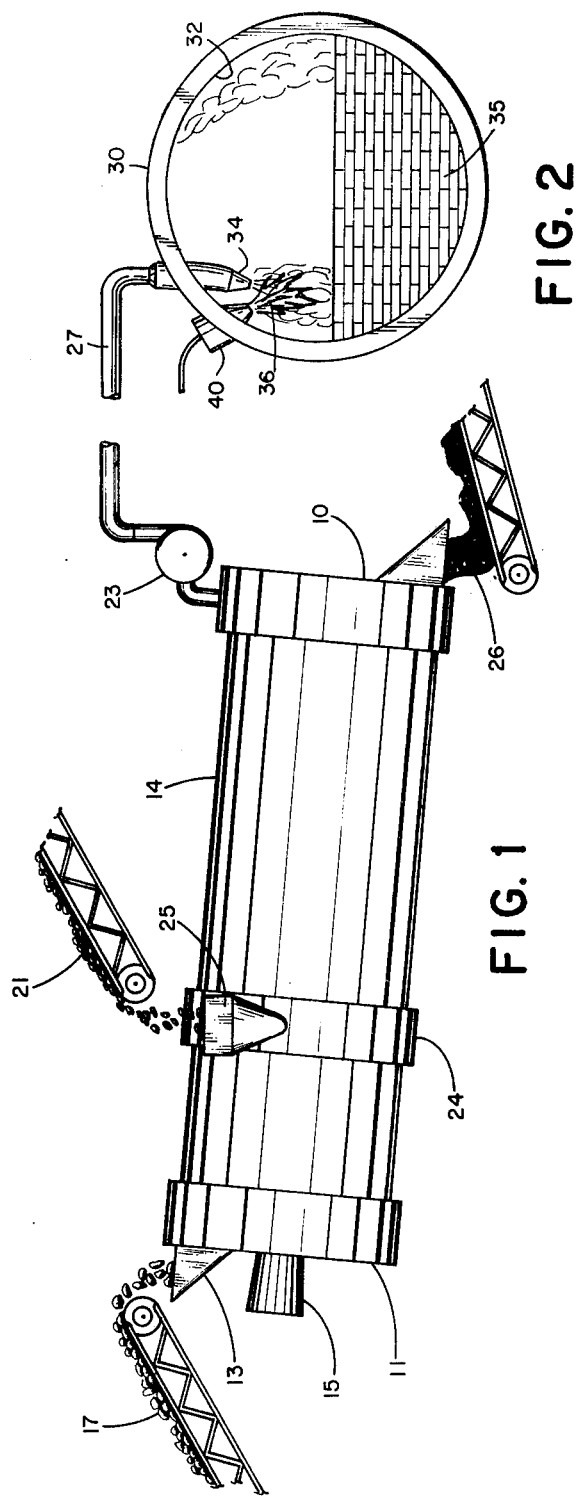

PROCESS FOR TREATING EXHAUST GASEOUS MIXTURES FROM DIRECTLY EXPOSING ASPHALT-AGGREGATE COMPOSITIONS TO HOT GASES

BACKGROUND OF THE INVENTION

In my co-pending application Ser. No. 603,357, filed Aug. 11, 1975, now U.S. Pat. No. 3,999,743, and Ser. No. 729,705, filed Oct. 5, 1976, now U.S. Pat. No. 4,096,588, there are disclosed methods and apparatus for recycling used asphalt-aggregate compositions. More specifically, in those applications there are disclosed methods and apparatus for directly exposing used asphalt-aggregate compositions to flame and/or hot gases of combustion. The apparatus disclosed, and which is of the type used in this invention, comprises an elongated rotating drum including lifters for alternately elevating the particles and then allowing them to drop in a cascading manner through the hot gases. Although the purpose of the inventions disclosed in those applications is to prevent overheating the asphalt-aggregate particles by separating the material to be recycled into different particle size ranges, and introducing the various particle sizes into areas of a heating apparatus where the hot gases of combustion to which the particles are exposed will be low enough to prevent overheating and degradation of the particles, it has been found that some volatilization of hydrocarbons results from exposure of particles to the hot gases in the processing. For example, where coarse composition particles are introduced into an input drum end where temperatures are at their hottest because of flame and hot gases of combustion being introduced into the drum at that end, for example, 1,000°–2,000° F. or more, some volatilization of hydrocarbons from the coarse asphalt containing particles will occur as they pass through these hot gases. In addition, it is also found that some smaller or fine asphalt containing particles will be present with the coarse composition introduced into the hottest input drum end, which fine particles have not become separated in the particle size separation processing, or have resulted from handling of the coarse particles as they are transferred from a stockpile for introduction into the heating apparatus. Since these small particles will become readily heated when exposed to the hot gases of combustion, volatilization of hydrocarbons therefrom during the direct exposure recycle processing may be unavoidable. This results in a visible smoke as the hydrocarbons condense in the cooled gaseous exhaust. It is also found that substantial amounts of inorganic or mineral particulate matter is present in the gaseous exhaust mixture. This particulate matter, mostly metal silicates, results from the aggregate present in the feed composition and is present in the exhaust in particle sizes of nominally 20 mesh and smaller. Accordingly, the resulting gaseous mixture created in such a recycle processing includes not only the relatively clean exhaust gases from the burner which has supplied the hot gases of combustion to the asphalt-aggregate heating apparatus, which gases include nitrogen, carbon dioxide, and water vapor, but also significant amounts of the asphalt hydrocarbon volatiles and visible inorganic or mineral particulate matter which should not be exhausted into the atmosphere where atmospheric pollution controls are required.

The treatment of such an exhaust mixture as described to meet pollution control standards is especially problematic. Because the gas contains little oxygen, but substantial amounts of carbon dioxide and water vapor as products of the burner hydrocarbon combustion, together with usual amounts of atmospheric nitrogen, it will not itself support combustion, even with the presence of the volatile hydrocarbons. Moreover, attempts to treat the mixture to remove the silicate mineral particulate matter, produced from aggregate fines in the feed composition, by conventional methods, is unacceptable. For example, wet scrubbers introduce even more water vapor into the gaseous mixture. On the other hand, a dry scrubber will not separate out the very small particles of below about 20–40 microns. Moreover, attempts to filter the gaseous mixture through a bag house quickly results in the hydrocarbon condensate plugging the fabric filter bag. Thus, it is to the treatment of this exhaust that the present invention is directed.

SUMMARY OF THE INVENTION

The present invention is directed to processing of a gaseous mixture resulting from directly exposing used asphalt-aggregate compositions to flame and/or hot gases of combustion during recycling. An apparatus and process for treating the used asphalt containing composition is disclosed in my aforesaid co-pending applications, which descriptions are incorporated herein by reference. The resulting gaseous mixture from the recycle processing which includes significant amounts of mineral particulate matter an volatilized hydrocarbons from the heated asphalt containing particles is treated according to this invention by directing it to a separate collection and treating chamber and exposing the mixture to a flame while introducing oxygen to support combustion. More specifically, a centrifugal combustion chamber is used, preferably which includes a nozzle having a restricted discharge orifice for introducing the recycle gaseous exhaust mixture therein, and a flame is directed on the mixture as it flows from the restricted nozzle end. Oxygen containing gas is also entrained into the combustion chamber to provide sufficient oxygen in the area of the flame and exhaust gas nozzle to support combustion of the volatilized hydrocarbons and achieve temperatures sufficient to melt and/or volatilize the mineral dust and particulate matter. The mineral melt is deposited within the chamber while the clean oxidized gases are vented.

BRIEF DESCRIPTION OF THE DRAWING

The drawing illustrates the apparatus of the invention for treating used asphalt-aggregate composition and exhaust gaseous mixture therefrom.

DETAILED DESCRIPTION OF THE INVENTION

The apparatus shown in the drawing includes an elongated rotatable drum 14 having means for introducing asphalt-aggregate particles therein. By the term asphalt-aggregate composition as used herein is meant a composition in which both asphalt and aggregate are present as particles containing both materials and are introduced into the heating and mixing drum 14. Specifically, these compositions will comprise used materials to be recycled, which is broken up from asphaltic concrete roads or other surfaces, crushed, and then introduced into the apparatus. Preferably, these materials will be screened and separated into different particle size portions ranging from coarse to fine, and may include two, three or more particle size portions as disclosed in my aforesaid applications.

The apparatus includes means for introducing these particles, and includes chutes or hoppers which communicate with the drum interior. Where composition is separated into two particle size compositions, coarse particles 17 are introduced at or adjacent the end of the apparatus via a chute 13, whereas smaller composition particles 21 are introduced via chute 25. Input end plate 11 is stationary and chute 13 is secured thereto with means for directing the composition particles into the drum interior. Burner 15, usually a natural gas or hydrocarbon burner, introduces flame and hot gases of combustion directly into the hollow drum interior. The drum interior is preferably provided with lifters for alternately lifting the composition particles as the drum rotates. The particles become heated as they fall from the lifters and pass through the hot gases of combustion. A state of the art type of chute or hopper arrangement may be used for introducing the particles into the apparatus. Alternatively, the apparatus may include a trough 24 and chute 25, which trough overlies a plurality of ports extending around the drum, not shown, and a plurality of scoops overlying the ports and secured to the drum exterior which pass through the trough thereby picking up composition and introducing it into the ports. Such an alternative means for introducing composition particles into the drum may be used at any position including the input end drum and is disclosed in more detail in my aforesaid co-pending applications as well as application Ser. No. 601,177, filed Aug. 1, 1975, now U.S. Pat. No. 4,034,968, which description is incorporated herein by reference. At the output drum end is a stationary end wall 10 through which product composition 26, which has thoroughly been heated and mixed, is recovered.

From the heating apparatus, the burner exhaust gases from burner 15 which pass through the cascading mass of asphalt-aggregate composition particles, include carbon dioxide and water vapor from the oxidation of the hydrocarbon burner fuel as well as substantial amounts of hydrocarbon volatile materials from the heated asphalt containing particles. Of course other gases are also be present such as nitrogen and some carbon monoxide. Although the carbon dioxide and water vapor could otherwise be exhausted directly into the atmosphere without presenting substantial atmospheric pollution problems, the presence of the significant amounts of visible inorganics or mineral particles and hydrocarbon materials volatilized from the asphalt usually cannot be tolerated, especially in areas of strict atmospheric pollution control. The exhaust gas mixture will often also contain significant amounts of visible inorganic or mineral particulate matter or dust, mostly silicates, resulting from the cascading aggregate containing particles. This dust is carried along by the burner exhaust stream flowing through the heating apparatus, and must also be removed to meet most pollution control standards. This exhaust gaseous mixture, treated according to the invention, is drawn from the rotating drum 14 at the output drum end via any convenient means such as an exhaust assembly which includes an exhaust stack or conduit 27 and a blower or fan 23.

The exhaust gas treating apparatus comprises a combustion chamber within a furnace structure 30. Within the combustion chamber, a flame 36 is directed into a stream of the exhaust mixture, and which flame is produced by a burner 40. Preferably, the burner will be a hydrocarbon burning type, well known to those skilled in the art. The hottest portion of the flame is preferably directed into the stream of inorganic dust and volatilized asphalt hydrocarbons near the end of a nozzle 34 which has a restricted orifice. More preferably, the burner will direct the flame so that the stream of exhaust gases will envelop the flame. Utilizing a restricted nozzle 34 cooperating with conduit 27 for introducing the exhaust gas into the furnace will create a vacuum according to the Bernoulli effect as the gas flows from the nozzle end. This will also pull oxygen containing gas from port 32 past fire wall 35 into the low pressure area thereby further improving ignition and oxidation of the asphalt hydrocarbon volatiles by flame 36. This additional hydrocarbon combustion further elevates the temperatures to achieve melting, and often even some vaporization of the inorganic-aggregate dust particles, most of which then condenses and are deposited on the interior furnace chamber walls. Thus, not only is the hydrocarbon smoke burned in the process, but mineral particulate matter is also removed.

Port 32 need only be of a size sufficient to allow necessary amounts of atmospheric oxygen containing gas to be entrained into the chamber to support combustion of the hydrocarbon materials. Other oxygen gas sources may also be used. In addition, the interior furnace surface is preferably circular as shown, with the nozzle 34 directing the gaseous mixture stream along the curved side surface of revolution, as shown, so that the resulting flow follows the circular chamber walls in a swirling manner. This will improve condensation and deposition of the molten mineral materials on the cooler wall surface, with the circularly moving stream subjecting the condensate to a centrifugal force. This centrifugal action thus will force the molten mineral condensate against the furnace wall which melt, prior to solidification, will further attract or hold particulate matter forced thereagainst from the exhaust mixture. The exhaust from the furnace chamber may then be vented by any suitable means, including ports or the like and the substantially cleaned and oxidized gaseous combustion products introduced into the atmosphere.

Although the preferred apparatus of the invention disclosed is that in which the asphalt-aggregate composition is introduced into the mixing and heating drum 14 in a plurality of zones, with smaller or fine composition particles being introduced downstream in a cooler drum zone in order to avoid overheating and burning of the asphalt, as previously explained, some fine particles may also be present in the coarse composition size range introduced in the hottest drum zone. Moreover, volatilization of some hydrocarbons from the heated asphalt may be unavoidable once the asphalt achieves a temperature of about 180° F. and above in every drum zone. Thus even careful sizing, separation and handling of the used compositions to avoid overheating, degradation and burning of gas, may not eliminate the hydrocarbon volatiles from being present in a gaseous exhaust from such a direct exposure heating of the compositions. Accordingly, the apparatus of the present invention, including the heating drum and combustion and deposition furnace, according to the invention, is useful in any recycle processing where asphalt-aggregate composition particles are heated by direct exposure to flame and/or hot gases of combustion. In other words, the gaseous exhaust mixture treatment process and apparatus described herein will be useful with asphalt-aggregate direct exposure heating equipment where all of the recycle feed is introduced in a single heating drum zone. Moreover, the exhaust mixture so treated herein is to be distinguished from gaseous mixtures obtained from indirect heating of asphalt-aggregate compositions as disclosed in my U.S. Pat. No. 3,845,941 since those gases do not contain exhaust gases of combustion, and will be readily ignitable and combustible, unlike those treated herein. In addition, those indirect heating gases do not normally contain the large quantities of mineral particulates because there is no significant exhaust gas draft passing through the drum as there is using the direct heating method of this invention. The advantages disclosed herein as well as modifications of the apparatus within the purview of the invention will be understood by those skilled in the art.

I claim:

1. A process for treating asphalt-aggregate compositions comprising directly exposing the composition in a heating chamber to hot gases of hydrocarbon combustion to form a gaseous exhaust mixture comprising carbon dioxide, water vapor, hydrocarbon volatiles from said asphalt, and mineral particulate matter from said aggregate, directing the gaseous mixture through a restricted nozzle orifice into a chamber, and simultaneously directing a flame and entraining oxygen containing gas to support combustion into said gaseous mixture as it flows from said nozzle.

2. The process of claim 1 including oxidizing said hydrocarbon volatiles and melting and depositing said particulate matter.

3. A process for treating asphalt-aggregate compositions comprising directly exposing the composition in a heating chamber to hot gases of hydrocarbon combustion to form an exhaust gaseous mixture comprising carbon dioxide, water vapor, hydrocarbon volatiles from said asphalt, and mineral particulate matter from said aggregate, directing a flame into a stream of said mixture, and supplying an oxygen containing gas into said stream sufficient to support combustion of said asphalt hydrocarbon volatiles and achieve a temperature sufficient to melt said mineral particulate matter.

4. The process of claim 3 wherein the gaseous mixture stream is directed along a circular furnace surface and whereby said mineral particulate melt is deposited on the surface.

5. The process of claim 4 wherein said gaseous mixture stream is directed in said furnace to create a centrifugal force thereon sufficient to force said particulate melt against the furnace surface.

* * * * *